Patented Jan. 16, 1934

1,943,341

UNITED STATES PATENT OFFICE 1,943,341

METHOD OF PRODUCING METAL CHLORIDES FROM ORES

Thomas A. Mitchell, Denver, Colo., assignor to Lafayette M. Hughes, Denver, Colo.

No Drawing. Application March 8, 1932
Serial No. 597,627

36 Claims. (Cl. 75—67)

This invention relates to a method of chloridizing metallurgical ores and more particularly to a method whereby the ore is preliminarily prepared and then chloridized while in a substantially dry condition to form an ore metal chloride.

The metallurgical ores containing the valuable metals, such as zinc, lead, copper, silver, gold, manganese, tungsten and vanadium, commonly occur in nature as sulfides, sulfates, oxides, silicates and carbonates. These ores may occur in simple forms containing but one of the valuable metals but more often they are complex mixtures of crystals of ore metal compounds, commonly occurring as sulfides, intermingled with one another and with large quantities of undesirable impurities, such as pyrite, and interspersed with the rock gangue of quartz and various silicates. It is this complexity of structure that has made it difficult or expensive to separate the ore values and particularly to recover them as soluble chlorides.

Of the methods heretofore suggested for treating the sulfide ores, one has involved passing chlorine gas over the hot dry ore; but this method has not proven economically successful owing to the fact that the expensive chlorine gas forms undesired products from the ore materials and is wasted. Chlorine reacts directly with a sulfide ore and forms sulfur chloride and free sulfur. The latter is soft at the temperature of the reaction and tends to adhere to the ore particles and hinder further penetration of the ore by the chlorine gas. Also, the sulfur chloride is oxidized by air in the presence of catalytic agents, such as iron oxide, to form sulfur trioxide, and this replaces some of the chlorine of the ore metal chlorides, thereby forming fixed sulfates which contaminate the ore metal chloride and causing the chlorine to be lost up the chimney. Also, any attempt at chloridizing a sulfide ore directly by the various chloridizing roasting processes, in which the ore is roasted with sodium or calcium chloride and a proportionate amount of sulfur, involves serious problems due to the use of a high temperature, such as volatilization and mechanical losses, as well as an inefficient procedure in which a desired ore metal may be held in the residue in such a condition that it cannot be easily recovered. If the sulfide ore is first roasted in an attempt to remove the sulfur content, part of the zinc and other metal sulfides are oxidized to sulfates which are highly stable and cannot be converted to chlorides in the subsequent treatment by chlorine or by hydrochloric acid gas. Furthermore, any high temperature roasting operation tends to produce refractory compounds, such as zinc silicate and ferrate, and these as well as the residual sulfides are chloridized only with difficulty and by a strong reagent.

Likewise, the aqueous bath methods of chlorination have not proven satisfactory. For example, if the sulfide ore is digested with a hot ferric chloride solution in the presence of chlorine gas the process is found to be highly inefficient, since the chlorine attacks many of the undesired ingredients as well as the valuable ore metal sulfides. If the process is prolonged to obtain a high extraction, then the iron of the ore goes into solution rapidly and various silicates are attacked, thus wasting further chlorine; and in fact it is found that the consumption of chlorine is several times what the theoretical calculations show that it should be. Hence the chlorination processes heretofore practiced have not been economically successful, and particularly where an extraction of more than 40 to 60 per cent of the ore metal sulfide is required.

I have found it desirable to so treat an ore in a substantially dry condition that the values are converted to soluble compounds which are retained in but may be readily separated from the undesired materials constituting the residue. To secure a high extraction, it is necessary that a sulfide ore, when it is roasted to remove sulfide sulfur, be so treated as not to form a sintered or fused mass and that the roasted ore material be in a porous, pulverulent or friable condition capable of being freely penetrated by a chloridizing gas. Also, an efficient method of chloridization should not require the preliminary removal of all of the sulfide sulfur and yet be capable of converting the difficultly chloridized compounds to chlorides and producing a desired ore metal chloride free from its sulfate.

It is accordingly the primary object of my invention to overcome such difficulties and to provide an efficient and economical method of producing chlorides of various ores, and particularly the sulfide ores, whether they are of low grade or concentrates and whether they are simple or complex ores containing one or more desirable ore metal values.

A further object is to provide a method of preliminarily preparing a sulfide ore and of subsequently chloridizing the same, which steps are so conducted and correlated that the ore may be readily and completely permeated by a gaseous chloridizing agent and the process may be carried out substantially to completion.

Another object is to provide a method of so treating a chloridizable sulfide ore that substantially all of the desired ore metal is recovered as a chloride and is not contaminated with its sulfate.

A further object is to provide a method of treating an ore material containing either a residual metal sulfide after a preliminary roasting operation or a considerable amount of the metal sulfide of a raw ore, which will result in an efficient use of the chloridizing reagent without any substantial waste or loss of chlorine. Various other objects will be apparent in the following disclosure.

In accordance with my invention, I have found that it is feasible and efficient to chloridize a simple or a complex sulfide ore in a substantially dry condition by means of gaseous reagents if the ore is preliminarily roasted under conditions which produce a non-sintered, granular or pulverulent material. This may be accomplished, as described and claimed broadly in my copending application Serial No. 449,079 filed May 1, 1930, if the ore is preliminarily calcined or roasted in the presence of an alkaline earth metal compound and a sulfur bearing material which are capable of reacting during the process to form an alkaline earth metal sulfate interspersed throughout the calcine. The presence of a sufficient quantity of alkaline earth material in intimate relation with the ore insures the formation of a friable, pulverulent or porous material which is easily permeated by a reagent gas in a subsequent chlorinating operation and it prevents the formation of a hard, indurate, vitreous or sintered mass which is not readily attacked by the reagent.

If the ore contains sulfides of metals, such as zinc, which tend to oxidize to either the oxide or the sulfate form when roasted in the presence of oxygen, the presence of an alkaline earth metal compound which is capable of and proportioned for reacting with the available sulfate radical serves to prevent such ore metals from being present as sulfates and will cause them to appear as oxides in the roasted product. The oxides are readily attackable by various chloridizing agents, and it is now feasible to use hydrochloric acid to convert them to chlorides and reserve the more powerful agents, such as chlorine, for attack on the refractory difficultly chloridized ingredients, such as zinc-iron compounds, the ore metal silicates, residual sulfides and so forth. Lead sulfide goes preferably to the sulfate form when roasted, although some oxide may be produced, but other metals such as zinc and copper are protected, as it were, by the presence of an alkaline earth metal oxygen compound which reacts preferentially with the available sulfate radical; and these metals remain as oxides, provided there is sufficient of the alkaline earth material present to combine with all of the available and reactable sulfate radical, not taken up preferentially by an ore metal, such as lead.

I have also discovered that the chloridizable ingredients of an ore material containing the sulfate radical, or compounds, such as a metal sulfide, capable of developing the sulfate radical during the process, may be efficiently and completely chloridized without serious loss of chlorine and without the formation of the sulfate of a chloridizable ore metal, if the reaction is carried on in the presence of an alkaline earth metal compound, such as calcium chloride or oxide, or equivalent materials, which are capable of and are proportioned for reacting with all of the available sulfate radical present or formed during the chloridizing process and of fixing the same as an insoluble sulfate. This phase of my invention may be applied in the chloridizing step of the process either to a partially or completely roasted sulfide ore, whether simple or complex in its nature, or to a raw ore, or a mixture of raw and roasted ores, containing a considerable amount of a metal sulfide, irrespective of the manner in which the ore has been preliminarily treated. A sulfide ore need not be roasted with an alkaline earth, as above described, since the sulfate radical developed or present during the chloridizing stage will be fixed and prevented from displacing chlorine; but it is, of course, desirable to so treat the ore preliminarily that the roasted product may be readily permeated by the chloridizing gases or liquid reagents. If a chloridizable metal sulfate is present, such as is the case when the ore is roasted without an alkaline earth metal compound to fix the available sulfate radical, an alkaline earth metal chloride, or a chloridizing reagent, such as hydrochloric acid gas, and an alkaline earth metal oxide, carbonate or hydroxide may be employed for converting the sulfate to the chloride. If a difficultly chloridizable material, such as a metal sulfide, is present, chlorine may be employed to form the ore metal chloride, while the alkaline earth metal compound serves to fix the available sulfate radical as an insoluble alkaline earth metal sulfate which goes with the residue during a subsequent leaching operation.

Of the alkaline earth metal compounds which may be employed in the initial roasting stage, I prefer to use the oxide, hydroxide or carbonate of calcium, barium, strontium or in certain cases magnesium, and I preferably employ an oxide or hydroxide of these and particularly of calcium. The sulfates of calcium, barium and strontium are substantially insoluble in water, hence they go readily with the residue when the roasted or the chloridized ore is leached with water, and these compounds are therefore preferred as reagents. Magnesium compounds will serve to make the roasted ore permeable to the chloridizing gases, but should be dissolved from the roasted material prior to chloridization, and in that case a metal compound which forms an insoluble sulfate should be employed for the step of rendering the available sulfate radical insoluble when the chlorides are formed. It will be understood that one may choose that reagent which best fits the type of ore and the special conditions of the process in any of its stages. While the carbonate gives desirable conditions owing to the evolution of carbon dioxide gas within the roasting mixture, thus increasing its porosity, yet it is generally desirable to employ the oxide or hydroxide and particularly because they make it possible to carry on the reaction at a much lower temperature than that at which calcium carbonate will be decomposed by heat.

I have found it desirable to roast the sulfide ore at as low a temperature as is feasible for burning the sulfide sulfur of the ore. It is not necessary to completely remove this sulfur, however, since it may be removed by the powerful reagent, chlorine, acting in the presence of air during the chloridizing stage. The resultant production of sulfur trioxide by oxidation of the sulfur chloride formed by the chloridizing reaction cannot drive off chloridion from the ore metal chlorides since the alkaline earth material present in the chloridizing stage will fix it as an insoluble sulfate and thus remove it from the zone of reaction. Consequently, it is now possible to leave a considerable amount of unroasted sulfide in the roasted product and allow the chlorine to remove it. I ordinarily leave 4 or 5% or even more of sulfide sulfur. Because of this, the roasting operation may be carried on autogeneously and at the lowest temperature at which the sulfur will burn off. If there is not sufficient sulfur in the ore to keep the combustion going, I may add an ore of higher sulfur content, such as iron pyrites, or other combustible material for the purpose. It is to be emphasized that this process applies to complex ores, so that the addition of a different ore does not present any difficulty beyond that of requiring one to select such metallurgical and chemical procedure as is best suited for the ore mixture employed. If desired, an oil or gas flame may be employed to aid in and to regulate the temperature of the roasting operation. In any case, the temperature is kept as low as is consistent with a proper operation of the roaster, so as to minimize the tendency for the material to sinter or melt or otherwise depart from the desired pulverulent and friable condition. A highly siliceous ore tends to sinter more easily than one low in silicates, but if there is sufficient alkaline earth material present and in a finely divided intimate association with the ore particles, the latter will not fuse together at the low temperature of operation. Agitation of the mass during roasting materially aids in keeping the ore particles separated. Since the alkaline earth material takes up all of the available sulfur trioxide, herein included under the term "sulfate radical", the roasting process does not have to be so conducted as to prevent the formation of sulfates.

The alkaline earth metal compound employed in the chloridizing step may comprise the chloride, oxide, hydroxide or carbonate of calcium, strontium or barium. It may be added after the roasting operation if desired, but it is preferable, if the ore tends to sinter easily during roasting, to add a sufficient excess of the reagent material mixed with the raw ore to insure that enough is present throughout both the roasting and chloridizing stages of the process to fix all of the available sulfate radical as an insoluble sulfate. If an ore has been roasted without an alkaline earth or without an excess thereof, or if any other type of oxidized ore containing sulfur is to be chloridized, the alkaline earth metal compound needs to be added to the material only in amount sufficient to fix as an insoluble sulfate all of the available sulfate radical present in the ore and developed from the residual sulfides or other sulfur compounds which may form sulfur trioxide or sulfates during the chloridizing stage. The chloride of the alkaline earth metal will serve the purpose during the chloridizing step since it will react directly with zinc or copper sulfate and the like to remove the sulfate radical therefrom, as well as to take up the sulfate radical which is available in the sulfur trioxide present. In fact, any excess of oxide left over after the roasting operation may be converted to the chloride along with the ore metals. It is to be understood that the process is not limited to a preliminary low temperature roasting operation. Certain types of ore may require a high temperature to prepare them for the subsequent treatment, but the presence of sufficient lime in the roasting operation and the use of chlorine or other powerful agent for the chloridizing will insure satisfactory results.

In order that the reactions may be accomplished to the maximum extent the ore material, which may be either a raw ore of low or high grade or a highly concentrated one and which contains or has added thereto sufficient sulfide sulfur to produce the required amount of alkaline earth metal sulfate, is ground to a finely divided size and is intimately mixed with the alkaline earth material, such as calcium oxide. This grinding operation is preferably carried on in the presence of water. This has a very desirable effect in that it brings the alkaline earth metal compound into intimate contact with the ore material and avoids that agglomeration of the ore particles which prevents the oxygen of the roasting atmosphere from getting at the sulfide hearts of the ore. Because of this intimacy of contact, the alkaline earth material separates the ore metal particles physically and so minimizes any reactions among themselves, such as the formation during calcination of a zinc-iron compound which is not easily attacked during a chloridizing operation and causes waste of zinc. The calcium oxide hydrates in the presence of water, and it reacts with such ore metal sulfates as zinc sulfate to convert the same directly to metal oxide and form hydrated calcium sulfate or gypsum. This aids in making the particles or pellets of the mixture of the finely divided ore material and lime more porous. This arises from the fact that water of hydration is driven off from the gypsum and the calcium hydroxide during the roasting operation, whereby the gases thus escaping tend to create pores and channels in the ore particles.

In order to make sure that the ore comes from the roasting process as a non-sintered and friable or pulverulent material I preferably so proportion the ingredients that the alkaline earth metal sulfate constitutes at least 5 or 10% of the total mass of the roast, but this amount may be varied within wide limits, as determined by the nature of the ore being treated and the conditions of the roasting operation. Ordinarily, I sample the ore and then calculate the amount of the alkaline earth metal compound as the molecular equivalent of those reactable metals which can form either sulfates or oxides during the roasting operation. If the ore has been roasted without an alkaline earth, then the roasted product is analyzed to determine the amount of sulfur present which is capable of providing the sulfate radical for combining with the alkaline earth metal. This amount may be modified in accordance with an analysis of the roasted or chloridized product for any sulfate radical present in the roast or the chloridized material which is still reactable with the alkaline earth metal compound. For example, if zinc sulfate is found, that means that the amount of alkaline earth material should have been higher.

My preferred method of effecting the chloridization of this roasted ore, is to subject the roast in its pulverulent or porous condition and, while substantially dry to the action of a chloridizing agent, which is preferably hydrochloric acid gas or chlorine gas or both, and particularly as described in my copending application Serial No. 503,324, filed Dec. 19, 1930, and as described and claimed broadly in my copending application Serial No. 687,827 filed September 1, 1933. Hydrochloric acid gas will effectively chloridize the oxides of the ore metals, while chlorine is capable of attacking the difficultly treated ingredients. By employing the two in series, I may treat the oxides first by means of hydrochloric acid and leave only the refractory materials for the chlorine. It will be appreciated that the preliminary roasting operation has removed a large part of the sulfide sulfur and so cut down the amount of chlorine required for treating the ore. If an iron compound is present, the process may be so carried on as to prevent the formation of iron chloride. For example, if the ore is pyritic, the iron may be roasted to an oxide, either ferrous or ferric. Then, by chloridizing the material in the presence of air and under oxidizing conditions and at a temperature at which ferric chloride is not stable, the iron may be obtained as iron oxide. A suitable temperature for this purpose is 250° C. but it may be varied widely. The temperature of the material during the first part of the chloridizing stage may be below the decomposition temperature of iron chloride, but the temperature will ultimately be raised to a point at which ferric chloride is not stable and ferric oxide will be formed by the oxidizing conditions existing in this chloridizing stage. It is to be understood that although the material is substantially dry and in a powdered condition, water is formed by the reaction of hydrochloric acid on the oxides and it may play an effective part in the process.

This step is preferably accomplished by passing the roast through a heated tube in counterflow relation to a current of the chloridizing gas, whereby the last traces of gas are absorbed in the fresh roasted material as it enters the tube and the material leaving the tube has been subjected for a sufficiently long time to the concentrated atmosphere of chloridizing gas to insure that every bit of the chloridizable portion of the ore has been treated. After the chloridization, the product is then treated to dissolve and separate the desired metals from the residue, as will be explained.

It is preferable to conduct this chloridizing operation in two stages. In the first, the hydrochloric acid gas converts the ore metal oxides to the chlorides. The reaction produces chemical water, hence the initial stage takes place in its presence. When the oxides have been converted to chlorides, the material may be passed to the second stage, where in the presence of the water carried by the substantially dry ore material, chlorine gas is employed to attack those ore metal compounds, such as the residual sulfides, which were not affected by the hydrochloric acid gas. Chlorine gas may be introduced at the exit end of the apparatus and be caused to pass in counterflow relation to the ore which is moving down the rotating tube and is showered through the gas by the baffles therein. The excess of chlorine gas may pass to the first stage and be taken up by the raw ore there. For the non-ferrous ores, the temperature is preferably kept low and ordinarily below or not much higher than the boiling point of water. Air may be introduced with either gas.

In order that the process may be more fully understood, the following specific examples may be noted. If an ore has been roasted according to standard practice and without an alkaline earth material to fix the available sulfate radical, then the roasted product is analyzed and calcium chloride, oxide, hydroxide or carbonate, or similar compounds of barium or strontium, is added to the roast at any required stage of the chloridizing operation in amount sufficient to fix the sulfate radical. For example, the raw sulfide ore may contain the following ingredients in addition to the gangue and other substances:

| | Per cent by weight |
|---|---|
| Zinc | 30 |
| Lead | 10 |
| Copper | 4 |
| Magnesium | 2 |
| Sulfur | 30 |

Such an ore may have been roasted incompletely at a low temperature so that about one-half of the zinc sulfide has been converted to an oxide, and there may be present various refractory or difficultly chloridized compounds, such as the ferrate, ferrite, silicate, sulfide and sulfate of zinc and other metals. The lead may be present largely as sulfate and the iron as ferric oxide. In that case, the alkaline earth to be added is calculated as the molecular equivalent of the total sulfur in the roasted ore, or at least that portion which will be made available for forming sulfates of zinc, copper and other metals capable of being chloridized. If half of the zinc remains as a sulfide, then in accordance with the molecular weights, I may provide a mixture of the roasted ore with 26% of calcium chloride or 13% of calcium oxide for the purpose of fixing the available sulfate radical. If the total sulfur content is assumed to be 3% by weight, or 60 pounds of sulfur per ton of ore, then 105 pounds of lime is required per ton of roasted material.

If the ore is to be both roasted and chloridized with lime, then the process may be carried on as follows, taking a special Gilman ore as an example, which analyzes as follows:

| Total sulfur | Fe | Pb | Cu | Zn | CaO | MgO | SiO₂ |
|---|---|---|---|---|---|---|---|
| 33.1 | 30.9 | 0.8 | 0.4 | 15.2 | 1.0 | 0.4 | 2.2 |

As above stated, the amount of the lime, selected for the alkaline earth material, is calculated to be the molecular equivalent of the zinc. The iron may be disregarded in this calculation since it will easily go to the oxide form. The molecular weights of the zinc and calcium oxide being in the ratio of 65 to 56, this gives a theoretical amount of 13.09 lbs. of CaO for the 15.2 lbs. of zinc. While the various conditions of the process as well as the particular chemical composition of the ore necessarily determine the exact amount of lime used, I generally prefer to have the lime in excess of the theoretical amount. A satisfactory treatment of the above described ore is obtained by utilizing 83 parts of ore and 17 parts of calcium oxide. It is to be noted that in this ore there is 33.1% of sulfur and that the iron forms 30.9%. This particular ore composition requires a larger addition of lime in the roasting operation, since there is a considerable amount of sulfur trioxide formed because of the catalytic effect of the large amount of iron oxide in the calcine upon the sulfur dioxide produced by burning the sulfur from the ore. Hence, in that case it is desirable to have a considerable amount of lime present so as to be sure to take up all of the sulfur trioxide that tends to combine with the zinc oxide. Also, the amount of gangue in the ore affects the calculation. If the ore is low in silicates, the lime content may be lower than where there is a considerable amount of gangue. In the latter case, the lime serves as a physical barrier between the siliceous material and hinders any tendency for the ore to form a sinter or to fuse together. Such lead as is present goes largely to the sulfate form. It will, of course, be understood that the amount of oxygen introduced into the reaction chamber may be regulated and thus aid in controlling both the temperature and the oxidizing conditions of the process.

The raw ore which is specified in the above example is ground to a coarse size, such as will pass through a screen of 20 meshes to the linear inch. After the amount of lime required has been calculated by sampling the ore, the calcium oxide, which has been previously obtained by burning limestone, is added to the ore material and this mixture is then ground, and preferably in the presence of water, in a ball mill so that the material will be in very finely divided condition, such as will pass through a screen of 150 meshes to the inch. During this wet grinding operation the calcium oxide is hydrated, and it will react with any zinc sulfate which happens to be present in the ore and convert it to zinc oxide and form gypsum. Thereafter, this slurry is dried in a suitable apparatus, but without separation of the soluble salts from the mixture, and the dry material is then ready to be roasted, but preferably after being ground to the size of a pea or finer to insure as nearly complete oxidation of the mass as possible.

For the roasting operation I may utilize various types of apparatus, such as a Wedge type of roaster having a succession of vertically arranged communicating chambers and revolving rakes to move the material from one chamber to another, or a long rotary tube inclined at such an angle that the material will gradually pass through the rotating tube from one end to the other while it is being thoroughly stirred or agitated by means of lifting flanges on the inside of the tube. The roaster may be suitably heated and the temperature controlled. For example, at the discharge end of the rotary tube an oil flame may be introduced in order to maintain the desired heat and start the reaction. Air is admitted as required for the flame and to oxidize the ore.

The temperature of the reaction chamber is kept as low as possible, and for the ore above specified the temperature may be maintained at 800° to 1000° F. at the lower end of the roaster. The temperature at the entrance end of the kiln may in some cases be as low as 300° F. In fact and as above explained, the temperature at which the ore mixture will stay ignited and burn autogeneously seems to be the practical temperature for any particular ore, but of course the range of temperatures will depend upon the ore composition as well as the results to be obtained. The Gilman ore as above described requires very little outside thermal input after the calcining starts, because the fuel is largely furnished by the pyrites which is present in the ore. On the other hand, an ore which is low in pyrites and high in silica may require considerable outside heat to keep it burning and remove a sufficient proportion of the sulfide sulfur. The rate at which the material passes through the roaster and the amount of air introduced to the material will, of course, be regulated depending upon the composition of the ore mixture. It is found that as the result of such an operation, the iron, copper and zinc are present in the roast as oxides while the lead is largely in the sulfate form. Hence the copper and zinc, and that portion of the lead which is present as an oxide, may be converted to soluble chlorides by chloridizing with hydrochloric acid gas or chlorine, while the iron may be kept in the oxide form by maintaining a sufficiently high temperature, so that it will go with the residue in a subsequent leaching operation.

After the roasting operation has been completed, the pulverulent roasted material is passed to the chloridizing apparatus for the absorption of the chloridizing gases and the conversion of the valuable ore metal oxides to chlorides. This apparatus may consist of two long revolving tubes, herein termed absorber and finisher, which are inclined like the roaster to cause the material to travel lengthwise therethrough. Hydrochloric acid gas, which serves as the initial chloridizing agent, is passed into one end of the first tube and chlorine into the second tube. These are preferably introduced into the exit ends of the tubes so that, as explained, the gaseous reagents and the roast will pass in a counterflow relation. The temperature of each chamber may be regulated, if required, and for this purpose each piece of apparatus may be in the form of a muffle jacketed by an outer heat interchange medium, such as a gas of the required temperature. If desired, a flame may be introduced into the lower end of either chloridizing chamber in order to further control the temperature therein. The material is fed into the upper end of each rotary chamber by a suitable feeding device so that the speed at which the material passes therethrough may be properly regulated. The interior of the tube is preferably equipped with stirring or lifting devices which as the tube rotates serve to lift the material and to shower it in streams continuously through the chloridizing gas.

In the first chamber or absorber, the hydrochloric acid reacts with the easily chloridized materials, such as zinc, calcium, copper and lead oxides, and with the iron oxide if permitted to do so. During the period in which the zinc and other oxides are being converted to the chlorides, the temperature may be kept below 100° C., and preferably about 80° C., but at such a temperature relative to the rate of gas movement through the absorber that sufficient water of reaction is vaporized and removed so that the ore material is kept in a substantially dry condition. Iron oxide is not attacked by hydrochloric acid gas in the presence of any considerable amount of zinc oxide, hence the low-temperature absorber stage may be so run as to serve to chloridize only the zinc and other desired metals but leave substantially all of the iron in the oxide form. In such a case, the material is fed through this first zone at such a rate that very little of the iron oxide can be attacked by the hydrochloric acid gas before the material goes to the finisher where the temperature is raised to a point at which ferric chloride is not stable.

If it is desired to form iron chloride and utilize it as a chloridizing agent, as described in my copending application Serial No. 503,324, filed Dec. 19, 1930, and as described and claimed in my copending application Serial No. 687,827, the absorber treatment is carried on under temperature and chloridizing conditions which result preferably in the formation of crystalline hydrated iron chloride, and particularly ferric chloride. This is accomplished best by the use of a strong atmosphere of hydrochloric acid gas after sufficient zinc oxide has been chloridized and by maintaining at the exit of the absorber a temperature, such as 90° C. or lower, which will leave the ferric chloride crystals unmelted and stable in the absence of a material amount of air. The ferric chloride thus produced is capable of reacting directly with refractory ore values, and particularly after the temperature has been raised in the finisher to a point at which the crystals melt and dissolve in their water of crystallization.

From this first absorber, the comparatively cold material is carried to the upper end of the second tube, or finisher, where the material is treated with chlorine to chloridize the refractory difficultly treated materials. If iron compounds are present, the material is gradually heated in the finisher to a temperature at which ferric and ferrous chlorides are not stable. The temperature at the exit end of the finisher is ordinarily maintained at about 250° to 300° C., if iron is present. At such a temperature and in the presence of air, any iron chloride present will be decomposed and oxidized to ferric oxide, with an evolution of nascent chlorine which reacts directly with the refractory ore values. If water is present, hydrochloric acid may also be formed. It is, however, preferred to heat the ore material as it is being passed in a counterflow relation to a current of air so that the chlorine atoms of the iron chlorides present will be evolved largely in the nascent condition. The temperature should be kept below that point at which ore materials will volatilize, but this will depend on the nature of the material being treated. This powerful reagent, chlorine, will be able to convert into the chlorides such compounds as the ferrate, silicate and aluminate of zinc, and to attack any sulfide which remains in the ore where the initial calcining operation has not been completed. The silica and other similar ore materials are inert and are not attacked by the chlorine at the temperature of this reaction.

In the first or absorber stage, the hydrochloric acid converts the excess of calcium oxide to the chloride, as well as attacking any other easily chloridizable material, such as the oxides of copper, lead, and so forth. The alkaline earth metal chloride stands ready to take up any available sulfate radical present or formed in the process. It is particularly needed in the finisher where chlorine gas and air are used and indirectly produce the sulfate radical. Because of the presence of this reagent, all of the available sulfate radical is fixed as an insoluble compound and so is easily separable from the ore metal chlorides. Consequently, these metal chlorides are obtained substantially uncontaminated by their sulfates. It will be understood that the gases are readily absorbed by the ore material owing to the fact that it is not vitreous or sintered together but is in a pulverulent or porous condition. Also, if the temperature is so high at the discharge end of the finisher as to cause volatilization of any of the ore values the colder entrance end of the chlorination chamber serves as a condenser and captures these volatilized materials.

In order that this hydrochloric acid may be readily formed in a cyclic relation to the other steps of the operation, I may utilize by-products of the process for this purpose. For example, I may take some of the calcium chloride formed later in the process where zinc carbonate is being produced from zinc chloride and calcium carbonate, and pass some of the sulfur dioxide gas formed in the calcining chamber over this calcium chloride in the presence of air and steam and thus form hydrochloric acid gas which may then be passed directly to the chloridizing tube.

The Gilman ore material, which comes from the finisher chloridizing chamber in a finely divided condition, is made up largely of zinc chloride, calcium sulfate, iron oxide, lead sulfate, lead chloride, and copper chloride and traces of calcium chloride. These may now be leached with water and other suitable solvents for dissolving the lead, zinc and copper salts, while the iron oxide and calcium sulfate are left in the residue with the gangue and any other ore ingredients which have not been brought into soluble form. The solutions may be suitably treated for recovering the values therefrom. If, for example, the solution is zinc chloride, it may be treated with calcium carbonate to precipitate zinc carbonate and leave calcium chloride in solution. The calcium chloride may be recovered by evaporation and used as above explained to form hydrochloric acid.

The presence of iron oxide gives a reddish color to the residue which makes the material available as a pigment for producing a red paint. The tone or color of such a pigment will depend on the nature and quantity of the other materials present, hence by suitably varying the ingredients useful products may be obtained. It will, therefore, be appreciated that those ore ingredients which have been heretofore considered undesirable, to say the least, are now brought into a commercially valuable form by my process. This pigment comprises the residue of unrecovered ore ingredients, including the ferric oxide and the calcium sulfate.

In this process, the lime or other alkaline earth material employed is believed to serve the following purposes: (1) It produces an open, porous and pulverulent or friable mass and so assists in producing a rapid low-temperature absorption of the roasting and chloridizing gases or other reagents employed for treating the ore material. This porosity is, of course, within the ore particle and does not refer to the spaces between the particles. Where slag-forming elements are present, as in low-grade complex ores, the use of lime in a low-temperature roasting operation prevents sintering of the ore particles. The calcium compounds are intermingled with and physically separate various constituents of the ore, and so hinder their chemically reacting with one another and forming such undesired products as zinc ferrate, aluminate or silicate. (2) It serves during both the roasting and the subsequent chloridizing operations to react with all the available sulfate radical which is present or formed during the reactions and to prevent the formation of a sulfate of those metals which are capable of forming either the sulfate or the oxide or chloride during this treatment. It, therefore, fixes all such available sulfate radical as a substantially insoluble substance capable of being easily separated from a soluble metal chloride derived from the process, thus making it feasible to obtain an ore metal chloride free from its sulfate. (3) It makes autogenous roasting commercially feasible, since it is now no longer necessary to remove all of the sulfide sulfur before the chloridizing operation to prevent its forming an undesired sulfate with an ore metal. Consequently, it is now desirable and feasible to allow the ore to burn without the aid of outside heat and at a low temperature at which fusion and sintering will not readily take place.

The chloridizing treatment above described also involves further important features. Many of the simple silicates are attacked by hydrochloric acid, and particularly after they have been roasted to a dull red heat, with the formation of a gelatinous silicic acid. This jelly-like material tends to form during the treatment of the roasted ore in the absorber by means of hydrochloric acid and if allowed to remain in that form would seriously interfere with the subsequent leaching and filtration steps. However, if a high temperature is used in the finisher, it serves to dehydrate this silicic acid and convert it to silica which is granular in character and insoluble in water and acids. Consequently, the ore metal values may now be obtained free from this gelatinous siliceous matter. The temperature required for dehydrating or decomposing the silicic acid will depend on the conditions of the prior treatment as well as the nature of the ore material; but the temperature employed for breaking down any ferric and ferrous chlorides which may have formed will ordinarily be satisfactory for converting the silicic acid jelly to the insoluble silica. Heating the material as high as 350° to 400° C. is effective for the purpose.

This case is a continuation in part of my prior application Serial No. 449,080 filed May 1, 1930.

Having thus described my invention, what I claim as new and desire to secure by Letters Patent is:

1. The method of treating a metallurgical ore to form a chloride of an ore metal value comprising the steps of roasting the ore in the presence of a sulfur-bearing material and an added compound of an alkaline earth metal which are capable of and are proportioned for reacting to form an alkaline earth metal sulfate and producing a non-sintered product containing said sulfate interspersed with an ore metal oxide which is permeable to chemical reagents, and thereafter chloridizing the roast to form an ore metal chloride therefrom.

2. The method of treating a metallurgical ore comprising the steps of mixing it intimately and in finely divided condition with an alkaline earth metal oxygen compound and a material capable of providing available sulfate radical which will produce an alkaline earth metal sulfate during roasting, then roasting the mixture to form an oxide of an ore metal and said sulfate, and then chloridizing the roasted material in the presence of said alkaline earth metal oxygen compound with a gaseous reagent capable of forming an ore metal chloride from said oxide.

3. The method of treating a sulfide ore comprising the steps of providing an intimate mixture of the ore in granular condition with an alkaline earth metal oxygen compound capable of and proportioned for reacting, during the roasting and chloridizing steps, with the available sulfate radical to form an insoluble sulfate, roasting the mixture while maintaining furnacing conditions capable of forming a porous, granular product containing said alkaline earth metal oxygen compound and sulfate interspersed therethrough, and thereafter chloridizing an ore metal compound by means of a reagent which permeates said porous product and forms a product free from soluble metal sulfates.

4. The method of treating an ore containing zinc sulfide comprising the steps of providing an intimate mixture of the ore with an alkaline earth metal compound capable of and proportioned for reacting with and fixing the available sulfate radical as an insoluble alkaline earth metal sulfate, roasting the mixture under furnacing conditions which produce zinc oxide and said sulfate interspersed throughout a non-sintered, porous, granular material, and chloridizing the roasted material with a reagent which permeates the pores of the roasted material and in the presence of alkaline earth metal chloride, whereby zinc chloride free from zinc sulfate is produced.

5. The method of treating a complex sulfide ore containing a compound of an ore metal capable of roasting to either the oxide or the sulfate form comprising the steps of providing an intimate, finely divided mixture of the ore with an alkaline earth metal oxygen compound capable of and proportioned for reacting with all available sulfate radical during the process, continuously agitating the mixture and roasting it at a low temperature and under furnacing conditions which cause the formation of a pulverulent, porous product containing alkaline earth metal sulfate interspersed with the oxide of said ore metal, and then chloridizing the roasted material with a gaseous reagent which permeates the porous product and converts said metal oxide to the chloride form, while maintaining sufficient alkaline earth metal oxygen compound present to react with all available sulfate radical and prevent the formation of a sulfate of said ore metal, whereby said metal may be recovered solely as a chloride.

6. The method of treating a complex sulfide ore comprising the steps of mixing the ore in finely divided condition with an alkaline earth metal oxygen compound capable of reacting with the available sulfate radical to form a sulfate thereof, adding water to the mixture and thereafter drying the material, roasting the dried material, while agitating it, under furnace conditions which produce a porous, non-sintered, granular product and then treating the roasted material with a chloridizing agent in the presence of an alkaline earth metal compound capable of fixing all of the available sulfate radical present and forming ore metal chlorides from the chloridizable ore metal compounds which may be present.

7. The method of treating a complex sulfide ore to form a chloride of an ore metal capable of roasting to either the oxide or the sulfate form comprising the steps of mixing the ore with an alkaline earth metal compound capable of and proportioned for reacting with all available sulfate radical, roasting the mixture and thereby producing a porous pulverulent product containing the oxide of said ore metal and an alkaline earth metal compound, and thereafter treating the roasted material with a gaseous halide reagent capable of reacting with said oxide and forming the halide of said ore metal.

8. The method of treating a metallurgical ore comprising the steps of providing an intimate mixture of ore with calcium oxide and a material providing the sulfate radical which are capable of and are proportioned for producing calcium sulfate, roasting the mixture under conditions which form a non-sintered, porous, pulverulent product, and thereafter chloridizing the roast in the presence of calcium chloride and fixing any available sulfate radical as calcium sulfate.

9. The method of treating a complex ore containing a metal sulfide comprising the steps of providing an intimate mixture of the ore and calcium oxide proportioned in excess of the amount required to react with the available sulfate radical during the roasting operation, then roasting the mixture at a low temperature, while agitating it, and maintaining furnace conditions which result in the production of a porous, pulverulent, non-sintered material containing calcium sulfate interspersed with the ore values, and thereafter converting the excess of calcium oxide to calcium chloride and chloridizing the roasted material with a gaseous reagent containing chlorine and in the presence of said chloride so as to fix all available sulfate radical and leave an ore metal chloride uncontaminated by a soluble sulfate.

10. The method of treating a complex sulfide ore containing iron and zinc compounds comprising the steps of mixing intimately with the ore in pulverized condition sufficient calcium oxide to be molecularly equivalent to all of the sulfate radical present and available during the roasting and chloridizing steps, roasting the ore under non-sintering conditions and forming a porous product containing zinc and iron oxides but free from the sulfates thereof, chloridizing the roasted material by means of a gaseous reagent which permeates said porous product and forms zinc chloride, while leaving the iron in the form of an oxide, and thereafter dissolving the zinc chloride and separating it from the residue as an iron free solution.

11. The method of claim 9 in which the ore and calcium oxide are mixed in the presence of water and the slurry is heated under conditions which cause the removal of water of hydration from the calcium hydrate and any hydrated gypsum formed during the process and thereby increasing the porosity of the ore particle to the gaseous chloridizing reagent, while forming a close association in finely divided form of a calcium compound and the ingredients of the ore, in which the calcium compound resists the formation of complex zinc compounds during the roasting operation and serves to fix the available sulfate radical during chloridization of the ore.

12. The method of chloridizing an ore material containing a metal sulfur compound comprising the steps of treating it in a substantially dry condition with a chloridizing agent which serves to convert said compound to a chloride and carrying on the reaction at a temperature below that at which the desired resultant chloride will volatilize and in the presence of a reagent added for the purpose which is capable of and is proportioned for reacting with any available sulfate radical and fixing it as an insoluble metal sulfate and thereafter recovering the metal chloride free from its sulfate.

13. The method of claim 12 in which an alkaline earth metal compound is employed to produce an insoluble alkaline earth metal sulfate with the available sulfate radical, and in which the desired ore metal chloride is subsequently dissolved and thereby separated from the residue containing said sulfate.

14. The method of chloridizing a metallurgical ore containing a metal sulfide comprising the steps of roasting the ore to remove a portion of the sulfide sulfur and thereafter treating the roasted material in a substantially dry condition with a chloridizing agent and in the presence of a material added for the purpose which is capable of and is proportioned for fixing the available sulfate radical as an insoluble compound and thereby producing a chloride of a metal of the ore which may be dissolved and recovered substantially free from its sulfate.

15. The method of recovering values from an ore material containing a chloridizable metal sulfide comprising the steps of chloridizing the material in a granular, substantially dry condition with a chlorine-bearing reagent and converting said sulfide to a chloride in situ, carrying on the reaction in the presence of an alkaline earth metal compound added for the purpose which is capable of and proportioned for fixing as an alkaline earth metal sulfate any available sulfate radical that may be present or formed during the chloridizing step, and thereafter dissolving and removing said chloride from the ore residue containing said sulfate.

16. The method of recovering values from an oxidized ore material containing a chloridizable metal sulfide comprising the steps of chloridizing the material in a granular, substantially dry condition with a gaseous chlorine-bearing reagent and converting said sulfide to a chloride in situ, and carrying on the reaction in the presence of an alkaline earth metal chloride added for the purpose, which is capable of and has been provided in amount sufficient for fixing the available sulfate radical as a substantially insoluble sulfate and producing an ore material containing said sulfate and ore residue, together with the desired chloride which my be readily separated from the insoluble materials by a leaching operation.

17. The method of chloridizing a sulfide ore in which the ore is first roasted with air to remove a portion of the sulfide sulfur and the roasted material is thereafter treated, in accordance with claim 15, with chloridizing reagents which are capable of converting a desired ore metal oxide and difficultly chloridized compounds to a chloride, whereby the available sulfate radical derived from the residual sulfide sulfur is fixed by the alkaline earth metal compound as an insoluble sulfate.

18. The method of claim 16 in which the ore material is first treated with hydrochloric acid gas to convert an ore metal oxide to the chloride and thereafter with chlorine gas to chloridize the residual sulfides or other refractory compounds therein.

19. The method of recovering values from a complex sulfide ore comprising the steps of roasting the ore to remove sulfide sulfur and providing a gas permeable ore material containing desired ore metal oxides and residual ore metal sulfides, treating the roasted material in a substantially dry condition with a chlorine-bearing gaseous reagent and converting the ore metal oxides and the residual sulfides in situ to the chlorides, carrying on the chloridization of the residual sulfides in the presence of the chloride of calcium, strontium or barium added for the purpose which is proportioned to fix as a substantially insoluble compound any available sulfate radical which may be present or derived from the residual sulfide sulfur, and thereafter dissolving the soluble chlorides and thus separating them from the ore residue and the alkaline earth metal sulfate.

20. The method of chloridizing a complex sulfide ore comprising the steps of roasting the ore with air to a low sulfide content, thereafter mixing the ore in a finely divided, gas-permeable condition with a reagent capable of providing alkaline earth metal chloride in amount sufficient to fix as an alkaline earth metal sulfate all of the available sulfate radical derived from the ore, treating the mixture with a gaseous chloridizing reagent which converts an ore metal oxide to the chloride and with a reagent providing the chlorine atom which converts a residual ore metal sulfide to a chloride, while the available sulfate radical is fixed and prevented from forming a sulfate of a chloridizable ore metal, and thereafter leaching the ore material and recovering soluble ore metal chlorides substantially free from their sulfates.

21. The method of chloridizing a sulfide ore comprising the steps of roasting the ore in pulverized condition with sufficient air to burn off sulfide sulfur, while agitating the material and maintaining low temperature conditions which produce a gas-permeable, non-sintered product, and thereafter chloridizing the roasted material in a granular, substantially dry condition with hydrochloric acid gas and chlorine to convert the metal oxides and residual sulfides to chlorides, and carrying on the chloridization of the residual sulfides in the presence of an alkaline earth metal compound added for the purpose which is capable of and is provided in amount sufficient for fixing the available sulfate radical as an insoluble alkaline earth metal sulfate.

22. The method of chloridizing an ore containing zinc sulfide comprising the steps of roasting the ore with air to remove a portion of the sulfide sulfur and thereafter chloridizing the zinc compounds by treating the ore material in a substantially dry, granular condition with a chlorine-bearing reagent and in the presence of an alkaline earth metal compound which is capable of and has been added in amount sufficient for fixing as an insoluble sulfate the available sulfate radical which may be present or formed during the chloridizing step, and thereby forming soluble zinc chloride interspersed in a residue of insoluble ore materials.

23. The method of chloridizing a zinc sulfide ore comprising the steps of roasting the ore autogeneously and under low temperature conditions which produce a granular non-sintered material containing zinc oxide, converting the zinc oxide to a soluble salt and treating the ore material with a chlorine-bearing reagent to chloridize the residual zinc sulfide and other refractory compounds, and carrying on the chloridization of the sulfide in the presence of an alkaline earth metal chloride added for the purpose which is capable of and proportioned for fixing the available sulfate radical and causing the formation of zinc chloride substantially free from its sulfate and thereafter dissolving the zinc chloride from the ore residue.

24. The method of chloridizing a zinc sulfide ore comprising the steps of roasting the ore under low temperature oxidizing conditions and providing a gas-permeable granular material containing zinc oxide and sulfide, treating the roasted material with hydrochloric acid gas to convert zinc oxide to the chloride and then treating it with a chlorine-bearing reagent to chloridize the residual zinc sulfide, and carrying on the chloridization of the zinc sulfide in the presence of an alkaline earth metal compound added for the purpose which is capable of and has been provided in amount sufficient for fixing the available sulfate radical present in the roasted material and derived by oxidization of the zinc sulfide and thereby producing an ore material containing zinc chloride.

25. The method of treating a complex ore containing the sulfides of iron and a valuable metal comprising the steps of roasting the ore with air to remove sulfide sulfur and form iron oxide, providing a mixture of the roasted material and an alkaline earth metal compound added for the purpose which is capable of and is proportioned for combining with the available sulfate radical to form alkaline earth metal sulfate, treating the mixture with a chloridizing agent under oxidizing conditions and leaving the iron within the ore material as ferric oxide while forming a chloride of the desired ore metal, and subsequently dissolving the ore metal chlorides and thus separating them from the residue containing the gangue, alkaline earth metal sulfate and ferric oxide.

26. The method of treating a metallurgical sulfide ore comprising the steps of mixing the ore intimately and in finely divided condition with an alkaline earth metal oxygen compound capable of forming a sulfate with the available sulfate radical during a roasting operation and thereafter roasting the mixture to produce a non-sintered, porous, pulverulent material containing an ore metal oxide and said sulfate and then chloridizing the mass with hydrochloric acid gas to form an ore metal chloride of said oxide.

27. The method of treating a metallurgical ore containing an ore metal sulfide comprising the steps of mixing the ore intimately with an alkaline earth metal oxygen compound capable of reacting to form a sulfate, said compound being present in such an amount that it will react with all of the sulfate radical which is available during the roasting and chloridizing operations, and thereafter roasting the material to form an ore metal oxide and said sulfate, then chloridizing the substantially dry mixture with a gas containing chlorine under conditions which will form a chloride of an ore metal compound.

28. The method of treating a metallurgical sulfide ore comprising the steps of mixing it in finely divided condition with an alkaline earth metal oxygen compound capable of reacting during the roasting operation to form a sulfate, said compound being present in amount sufficient to fix all of the available sulfate radical during the roasting and chloridizing steps, then roasting the mixture to form said sulfate and an ore metal oxide in a non-sintered and gas-permeable material, thereafter chloridizing the mixture with hydrochloric acid gas and chlorine to convert the ore metal oxide and the residual sulfide to a chloride and subsequently dissolving said chloride from the ore residue.

29. The method of treating a metallurgical ore containing the sulfides of iron and a valuable ore metal comprising the steps of mixing the ore with an alkaline earth metal oxygen compound capable of forming a sulfate during the roasting operation, said compound being present in amount sufficient for reacting during the roasting operation with available sulfate radical and producing a non-sintered material, then roasting the mixture in a granular condition to form oxides of iron and the ore metal and said alkaline earth metal sulfate interspersed in a non-sintered, gas-permeable material, thereafter chloridizing the mass under oxidizing conditions and at a temperature above that at which the iron chlorides are stable and producing ferric oxide and a chloride of the ore metal and subsequently dissolving the chloride from the ore material and leaving the iron oxide in the residue.

30. The cyclic method of treating a metallurgical ore containing zinc sulfide comprising the steps of roasting it with a calcium oxygen compound and forming sulfur dioxide, zinc oxide and calcium sulfate, chloridizing the mass with hydrochloric acid gas, dissolving the zinc chloride therefrom, treating the solution with calcium carbonate to form zinc carbonate and calcium chloride and passing the sulfur dioxide gas with steam and air over the calcium chloride to form hydrochloric acid gas for use in chloridizing the roasted ore.

31. The method of making a pigment from a pyritic ore containing a sulfide of a valuable metal comprising the steps of adding alkaline earth metal oxide to the ore and roasting the mixture in a pulverized condition to form the oxide of iron and alkaline earth metal sulfate, chloridizing the roasted material to form a chloride of the ore metal, heating the material under oxidizing conditions to insure that the iron content is in the form of ferric oxide, recovering said metal chloride, and providing a pulverized material containing the gangue and said alkaline earth metal sulfate and ferric oxide.

32. The method of making a pigment from an ore containing the sulfides of iron and a valuable ore metal comprising the steps of roasting the ore with air to a low sulfide content and to form iron oxide, adding to the roasted material an alkaline earth metal compound which is capable of and is proportioned for fixing the available sulfate radical as an insoluble compound, treating the mixture with a chloridizing reagent to convert the sulfide and other compounds of said ore metal to a chloride, with a resultant production of alkaline earth metal sulfate, and heating the ore mixture with air to a temperature at which the iron chlorides are not stable and producing ferric oxide, and thereafter dissolving the soluble ore metal chloride and providing a pulverized residue of ore gangue, ferric oxide and alkaline earth metal sulfate for use as a pigment.

33. The method of chloridizing an ore containing a chloridizable metal sulfide and an acid soluble silicate comprising the steps of roasting the ore to remove sulfide sulfur, treating the roasted material with hydrochloric acid gas which tends to form silicic acid from the silicate and producing a chloride of an ore metal, heating the ore material in the presence of a reagent added for the purpose which is capable of and proportioned for fixing any available sulfate radical as an insoluble sulfate, and maintaining temperature conditions which serve to dehydrate any silicic acid present and produce insoluble siliceous material, whereby an ore metal chloride may be readily dissolved from the ore material free from a sulfate of said metal or silicic acid.

34. The method of chloridizing a sulfide ore material containing an acid soluble silicate comprising the steps of treating the material in a substantially dry condition with an acidic chloridizing reagent and under conditions which form silicic acid and an ore metal chloride and thereafter heating the chloridized mixture to a temperature at which the silicic acid is dehydrated and rendered insoluble, carrying on the chloridization in the presence of an alkaline earth material added for the purpose which is capable of and is proportioned for fixing the available sulfate radical as an insoluble sulfate, and ultimately leaching the ore metal chloride from the ore material without interference by and recovering it free from silicic acid.

35. The method of treating an ore material containing ferric oxide according to claim 34 in which the material is treated with hydrochloric acid gas to form an ore metal chloride, after which the material is heated with air to convert any ferric chloride present to ferric oxide and dehydrate the silicic acid, whereby the desired ore metal chloride may be recovered in a solution which is substantially free from iron, silicic acid and the sulfate of said ore metal.

36. The method of chloridizing an oxidized ore material containing zinc oxide and a sulfur compound, iron oxide and an acid soluble silicate comprising the steps of mixing it intimately with an alkaline earth metal compound which is capable of and proportioned for fixing the available sulfate radical as an insoluble compound, treating the roast with an acid to convert the zinc oxide to a soluble salt and thereby forming silicic acid, treating the material in a substantially dry condition with a chloridizing reagent to convert a residual zinc compound to a chloride and heating it with air to a temperature at which silicic acid and the iron chlorides are not stable and thus dehydrating the silicic acid and producing ferric oxide, and ultimately leaching the zinc chloride from the ore residue and obtaining it in solution substantially free from zinc sulfate as well as silicic acid and iron.

THOMAS A. MITCHELL.